United States Patent

[11] 3,633,102

[72] Inventor Alan Edgar Heather
 Hedge End, Southampton, England
[21] Appl. No. 810,495
[22] Filed Mar. 26, 1969
[45] Patented Jan. 4, 1972
[73] Assignee U.S. Philips Corporation
 New York, N.Y.
[32] Priority Apr. 17, 1968
[33] Great Britain
[31] 18,157/68

[54] ELECTRICAL COMPONENT TEST APPARATUS
 8 Claims, 4 Drawing Figs.
[52] U.S. Cl. .................................................. 324/158 F,
 339/193 VS
[51] Int. Cl. ............................................... G01r 31/22,
 H01r 13/50
[50] Field of Search ....................................... 324/158 F,
 158, 24, 25, 26, 27; 339/191, 192, 193, 192 T, 193
 VS

[56] References Cited
 UNITED STATES PATENTS
3,239,760 3/1966 Schweitzer .................. 324/158
3,517,144 6/1970 Arsenault et al. ............. 324/158 X
2,850,714 9/1958 Pace ............................. 339/193

Primary Examiner—Rudolph V. Rolinec
Assistant Examiner—Ernest F. Karlsen
Attorney—Frank R. Trifari ABSTRACT: An electrical component test apparatus for testing such components as transistors and other solid-state devices. The apparatus comprises a socket member in combination with a socket receptacle member. The socket member comprises a cylindrical body of insulating material having a plurality of substantially parallel extending longitudinal metal guide tubes for receiving and engaging in electrical contact the lead wires of the electrical component to be tested. Each of the metal tubes has a portion exposed at an opening in a sidewall of the socket body. The socket receptacle member comprises a base having an aperture for receiving the socket body. The base is further provided with a plurality of electrically conductive contact bodies located adjacent the aperture and a corresponding plurality of clamping screws axially movable through the base and through one of the contact bodies for movement toward and away from the aperture holding the socket member. The movable members are each engageable with the exposed portion of one of the metal tubes so as to produce electrical contact with one of the leads of the component being tested. Contact between the electrical component being tested and appropriate test circuitry is established through the contact bodies.

PATENTED JAN 4 1972 3,633,102

INVENTOR.
ALAN EDGAR HEATHER
BY
AGENT

ELECTRICAL COMPONENT TEST APPARATUS

This invention relates to electrical component test apparatus comprising the combination of a socket and a socket receptacle, such apparatus being suitable, for example, in the electrical testing of semiconductor devices.

In the electrical testing of electrical components such as semiconductor devices it is common practice to use a test socket comprising a member of insulting material, for example of polypropylene or PTFE, within which there is located a plurality of substantially parallel extending metal guide tubes for receiving and engaging in electrical contact the lead wires of the component. The guide tubes terminate at one end in an upper plane surface of the member and at the other end project beyond the insulating material of the member and form soldering tags for the connection of wires forming part of the test circuit. These test sockets have limitations in respect of their application for high-frequency testing and in respect of the difficulties involved in their replacement when they become subject to wear. For high-frequency testing, for example in the testing of transistors at frequencies of 175 mc./s. and above, long guide tubes in the series path from the connection wires to the leads of the transistor give rise to a high inductive reactance and radiofrequency series resistance. Furthermore when a worn socket has to be replaced the connection wires have to be unsoldered from the tags at the ends of the guide tubes and this is a time-consuming and expensive operation when the testing is done in the mass manufacture of electrical components. The latter disadvantage is overcome in some apparatus in which a modified form of the described test socket is incorporated in a mating receptacle and the connection wires are soldered to terminal posts on the mating receptacle. This facilitates the rapid exchange of a test socket but it does not constitute any improvement with regard to the high-frequency testing limitations of the socket since the guide tubes still give rise to an undesirably high inductive reactance and radiofrequency series resistance.

According to the invention an electrical component test apparatus comprises the combination of a socket and a socket receptacle, the socket comprising a substantially cylindrical insulating member within which there is located a plurality of substantially parallel extending metal guide tubes for receiving and engaging in electrical contact the lead wires of an electrical component to be tested. Each guide tube has a portion exposed or an opening in a sidewall of the insulating member. The socket receptacle comprises a base member of insulating material having an aperture for receiving the socket, a plurality of electrically conductive, contact bodies to which external connections may be made situated in the base adjacent the aperture therein, and a corresponding plurality of electrically conductive, moveable members each in electrical contact with one contact body and moveable within the aperture through an opening in a sidewall of the socket insulating member in to and out of electrical contact with the portion of a guide tube exposed at said opening.

This structure of the apparatus permits the rapid replacement of a socket, and in a certain form, to be described hereinafter, may be used for high-frequency testing. Electrical contact from a test circuit to the lead wires of a component is via the contact bodies, the moveable members and parts of the guide tubes. In a preferred form which is suitable for high-frequency testing, each opening in the side wall of the socket insulating member may be situated so that said electrical contact between the movable members and the exposed portions of the guide tubes is made adjacent the ends of the guide tubes at which the lead wires of a component are inserted. The effective lead length of the component is thus considerably reduced in comparison to the prior art sockets and this facilitates high-frequency testing due to the consequential reduction in inductive reactance and RF series resistance. The replacement of a socket is readily facilitated since electrical contact from the test circuit to the apparatus is by way of connections on the contact bodies in the base.

The moveable members may each comprise a rod having a threaded portion which is located in an internally threaded portion of a contact body. Each rod may consist of a clamping screw having a shank which is moveable within a bore in the base and within the internally threaded portion of the contact body and a head which is situated externally of the base.

The contact bodies may each comprise a cylindrical insert situated in the insulating base, the opposite end faces of each insert being exposed at opposite major sides of the base. Electrical contact from the test circuit to the apparatus may be provided by soldering wires forming part of the test circuit on the end faces of the inserts.

The insulating member of the socket may be of substantially cylindrical form and the aperture in the insulating base of the socket receptacle may be of a corresponding circular form having a diameter such that the socket insulating member slidingly fits in said aperture.

In one preferred form of the socket the exposed portions of the guide tubes are situated at the base of cylindrical bores in the sidewall of the insulating member. In this form the moveable members of the socket receptacle extend in said bores and are moveable in and out of electrical contact with the exposed portions of the guide tubes at the base of said bores. When the moveable members are clamping screws these members may serve additionally to secure the socket in the socket receptacle. In such an apparatus suitable for high-frequency testing it is desirable to arrange the bores as close as possible to the ends of the guide tubes at which the leads of an electrical component are inserted.

In another preferred form of the socket the exposed portions of the guide tubes are situated at the base of a circumferential slot in the sidewall of the insulating member. In this socket it is also desirable that said slot is in close proximity of the ends of the guide tubes at which the leads of an electrical component are inserted when it is desired to use the apparatus for high-frequency testing.

In yet another preferred form of the socket the exposed portions of the guide tubes are situated at the base of longitudinal slots in the sidewall of the insulating member, said slots extending from one end face of the insulating member and terminating near the other end face at which the lead wires of the component are inserted in the guide tubes. In this form of the socket, insertion in the socket receptacle is readily facilitated without significant movement of the moveable members being required since the longitudinal slots in the sidewall of the insulating member permit the socket to be inserted in the aperture in the insulating base when the moveable members still extend at least partially into the aperture. Furthermore this arrangement permits the correct orientation of the socket in the socket receptacle to be obtained without difficulty.

Embodiments of the invention will now be described, by way of example, with reference to the accompanying diagrammatic drawing, in which.

Figure 1:
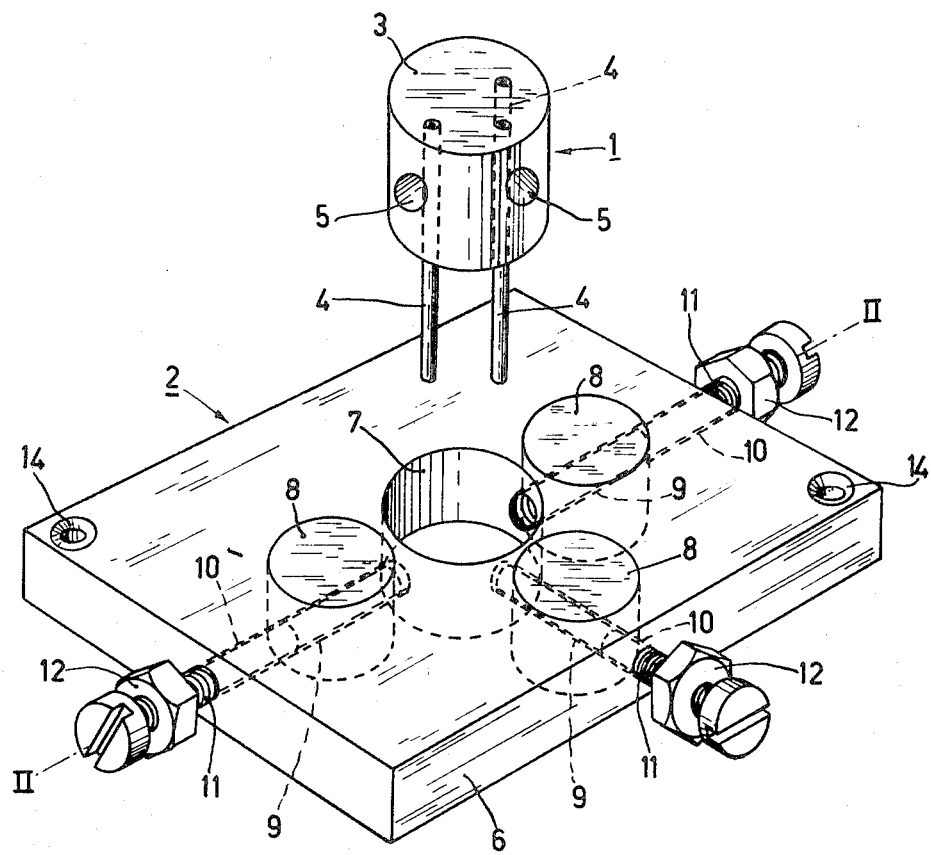
FIG. 1 is a perspective view of an electrical component test apparatus according to the invention comprising a socket and a socket receptacle, the socket being shown above the socket receptacle prior to insertion in an aperture therein.
Figure 2:
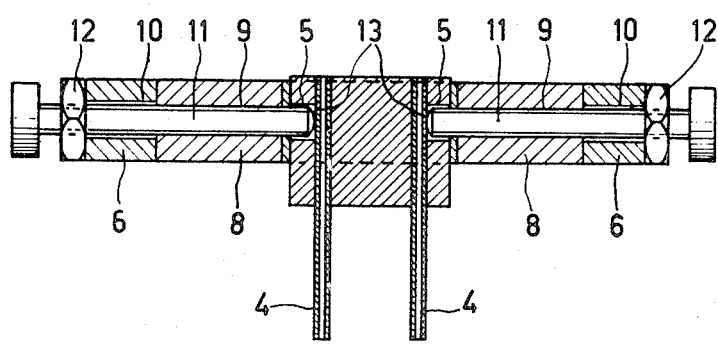
FIG. 2 is a cross section of the apparatus shown in FIG. 1 with the socket inserted in the aperture in the socket receptacle, the section being along the line II—II shown in FIG. 1.

The electrical component test apparatus shown in FIGS. 1 and 2 comprises a socket 1 and a mating socket receptacle 2. The socket comprises a cylindrical member 3 of PTFE within which three parallel extending longitudinal metal guide tubes 4 are moulded. The guide tubes 4 terminate at one end in the upper surface of the member 3 and at their other ends project beyond the lower surface of the member 3. In the side wall of the member 3 adjacent the upper surface thereof there are three cylindrical bores 5, each bore 5 exposing an upper portion of one of the guide tubes 4.

The mating socket receptacle 2 comprises a rectangular insulating base 6 of PTFE. In the center of the base 6 there is a cylindrical aperture 7 having a diameter slightly larger than that of the socket insulating member 3 so that the socket slidingly fits in the aperture 7. In the base 6 there are three contact bodies consisting of cylindrical brass inserts 8 situated adjacent the aperture 7. The brass inserts 8 extend entirely through the base 6 with their opposite end faces situated substantially flush with the opposite major surfaces of the base 6. In each of the brass inserts 8 there is an internally threaded bore 9. The bores 9 are in axial alignment with bores 10 in the base 6, the bores 10 extending from the three side faces of the member and each terminating in the aperture 7. In each of the bores 9, 10 there is an electrically conductive moveable member consisting of a brass clamping screw 11. The shanks of the clamping screws 11 can move in the bores 10 in the insulating base, in the correspondingly internally threaded bores 9 in the brass inserts 8 and in the aperture 7. The heads of the screws 11 are situated externally of the base and locking nuts 12 are provided for abutment with the side faces of the base 6.

In operation the socket 1 is inserted in the aperture 7 in the socket receptacle 2 with the three bores 5 in axial alignment with the three bores 9, 10. The clamping screws 11 are then turned in a clockwise direction so that the ends of the shanks extend in the bores 5 and eventually engage exposed upper portions 13 of the guide tubes 4. Electrical contact is thus established between the exposed upper portions 13 of the guide tubes 4 and the brass inserts 8 on the surface of which wires forming part of the test circuit are soldered. The lead wires of an electrical component are inserted in the guide tubes 4 with the body of the component resting on the upper surface of the socket insulating member 3.

The insulating base 6 is secured to a suitable platform with the aid of screws situated in apertures 14 at two opposite corners of the base 6. The apparatus shown in FIGS. 1 and 2 in which the socket has 3 guide tubes is suitable for the high-frequency testing of a transistor. It will be apparent that due to the positioning of the bores 5 near the upper surface of the socket exposing the upper portions 13 of the guide tubes 4 and due to the close proximity of the brass inserts 8 to the aperture 7, the effective lead length of the component in the testing operation is minimized. Furthermore withdrawal of the socket is readily achieved by rotating the clamping screws 11 in an anticlockwise direction and then sliding the socket out of the aperture 7. A new socket can be inserted and this operation does not necessitate the resoldering of any connections from the test circuitry.

Figures 3, 4:
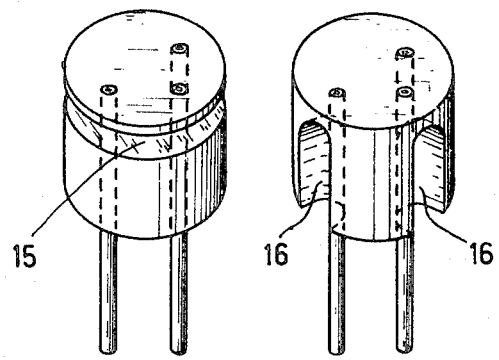
FIGS. 3 and 4 show in perspective view modified sockets suitable for use with the socket receptacle shown in FIG. 1.

The modified socket shown in FIG. 3 has the same major dimensions as the socket shown in FIG. 1 but differs in that instead of having three separate bores in the sidewall there is a circumferential slot 15 in the sidewall adjacent the upper surface of the insulating member. This slot is of a depth sufficient to expose upper portions of the guide tubes. In the modified socket shown in FIG 4 the guide tubes are exposed by longitudinal shots 16 in the side wall of the insulating member. The slots 16 extend from the lower surface of the member and terminate near the upper surface. This modified form of the socket has the advantage that for insertion and withdrawal from the aperture 7 in the mating socket receptacle it is not necessary that the ends of the clamping screws 11 are completely withdrawn from the aperture 7. Furthermore when inserting the socket in the aperture 7 the ends of the clamping screws projecting into the aperture 7 may serve for the alignment of the socket in the aperture.

Although the embodiments described all show apparatus suitable for the testing of components having three leads, other apparatus falling within the scope of the invention are suitable for the testing of components having more than three leads. In such apparatus the number of guide tubes in the socket are appropriately increased as also are the number of brass inserts and associated clamping screws in the insulating base of the socket insulating member.

What we claim is:

1. An electrical component test apparatus comprising the combination of a socket and a socket receptacle, the socket comprising a substantially cylindrical body of insulating material, for receiving the electrical component to be tested, a plurality of substantially parallel extending longitudinal metal guide tubes for receiving and engaging in electrical contact the lead wires of the electrical component to be inserted therein, at least one opening in a sidewall of the socket body for exposing a portion of each of said metal guide tubes, the socket receptacle comprising a base member of insulating material, an aperture located in said base member for receiving the socket, a plurality of electrically conductive contact bodies for making contact with test leads mounted in the base member adjacent the aperture, and a corresponding plurality of electrically conductive movable members each in electrical contact with one of said contact bodies and movable within the aperture through an opening in a sidewall of the socket body toward and away from said socket in said aperture for electrical engagement and disengagement with the portion of the longitudinal guide tube exposed at said opening.

2. The electrical component test apparatus according to claim 1, wherein each of said movable members is a clamping screw comprising a threaded shank portion and a head portion, said contact bodies further comprising an internally threaded bore for carrying therethrough said threaded shank portion of said movable member, and said base member further comprising a bore in axial alignment with the internally threaded bore of said contact body so that said shank portion is carried therethrough so that the head portion is located externally of said base member, wherein rotational movement of said head portion will produce axial displacement of said clamping screw toward and away from electrical engagement with one of said guide tubes.

3. The electrical component test apparatus according to claim 1, wherein each of said contact bodies comprise a cylindrical insert situated in the base member, the opposite end faces of each insert being flush with the opposite major sides of the base member so that contact with test circuitry may be established.

4. The electrical component test apparatus according to claim 2 wherein said aperture located in said base member is of a circular form having a diameter such that said cylindrical socket body may be slidingly fit in said aperture.

5. The electrical component test apparatus according to claim 4 wherein the exposed portions of the guide tubes are situated at the base of cylindrical bores in the sidewall of the socket.

6. The electrical component test apparatus according to claim 4 wherein the exposed portions of the guide tubes are situated at the base of a circumferential slot in the sidewall of the socket.

7. The electrical component test apparatus according to claim 4 wherein the exposed portions of the guide tubes are situated at the base of longitudinal slots in the sidewall of the socket, said slots extending from one end face of the socket and terminating near the other end face at which the lead wires of a component are inserted in the guide tubes.

8. The electrical component test apparatus according to claim 4 wherein each opening in the sidewall of the socket insulating member is situated so that said electrical contact between the movable members and the exposed portions of the guide tubes is made adjacent the ends of the guide tubes at which the lead wires of the component can be inserted.

* * * * *